No. 654,565. Patented July 24, 1900.
J. H. GOSS.
INFLATION VALVE.
(Application filed Apr. 18, 1900.)
(No Model.)
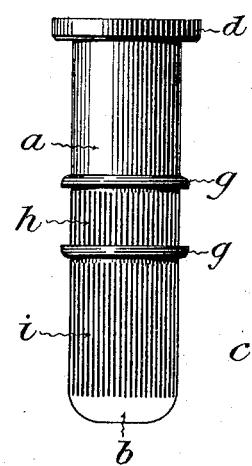
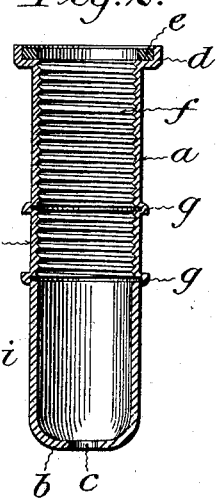
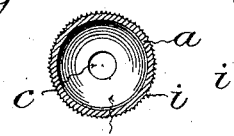
Witnesses:
Inventor:

UNITED STATES PATENT OFFICE.

JOHN H. GOSS, OF WATERBURY, CONNECTICUT, ASSIGNOR TO THE SCOVILL MANUFACTURING COMPANY, OF SAME PLACE.

INFLATION-VALVE.

SPECIFICATION forming part of Letters Patent No. 654,565, dated July 24, 1900.

Application filed April 18, 1900. Serial No. 13,362. (No model.)

*To all whom it may concern:*

Be it known that I, JOHN H. GOSS, a citizen of the United States, residing at Waterbury, in the county of New Haven and State of Connecticut, have invented a certain new and useful Improvement in Inflation-Valves, of which the following is a full, clear, and exact description.

This invention relates to means for supporting an inflation-valve in or upon the object to which it is applied in such manner that the valve itself, including its casing, may be bodily removed from the support without marring either the support or any portion of the valve, and thereby providing for the repairing or replacing of the valve in case of injury without disturbing its support or the connection of said support with the object to which it is applied. In the patent granted jointly to myself and Edward O. Goss, assignors to the Scovill Manufacturing Company, No. 632,218, dated August 29, 1899, is an instance of a tubular support of this character.

The present invention is designed especially to furnish a valve support or fastening for "single-tube" tires, so called, and extensively used on bicycle and other wheels, and which tires are provided with cots to receive the valve.

In carrying out my invention I employ in the most specific form a cylindrical tube having its inner end drawn in and closed, saving for an opening only sufficient for the passage of air, and having its outer end socketed and screw-threaded internally to receive the inflation-valve by its casing, and having external circumferential beads and longitudinal ridges, the said beads and ridges serving to grip the cot and resist longitudinal displacement and any tendency of the tube to turn in application and use, all as I will proceed now more particularly to set forth and finally claim.

In the accompanying drawings, illustrating my invention, in the several figures of which like parts are similarly designated, Figure 1 is an elevation, and Fig. 2 a longitudinal section, of my improved valve support or fastening. Fig. 3 is a section showing the support or fastening in position in the tire-cot, the valve itself being in position therein and shown in elevation. Fig. 4 is a cross-section of Fig. 1, taken in a plane below the circumferential beads and looking down.

As is obvious, the drawings show the parts enlarged.

The support or fastening $a$ may be drawn or otherwise produced from sheet metal in the form of a tube, with its lower or inner end $b$ closed, excepting for the air-passage $c$, and the inner end is thus constructed in order to provide for the exclusion of foreign matter in vulcanizing or otherwise applying a tube to an object. The upper or outer end is provided with a socket $d$ to limit the descent of the valve proper into the support or fastening, and in order to provide an air-tight joint at this point a packing-ring $e$ may be interposed, and such packing-ring may be carried by the valve or by the support or fastening. The interior of the tube is screw-threaded at $f$ to receive the external screw-thread on the valve proper. The exterior of the tube has one or more circumferential beads $g$, and it is also milled or otherwise ridged, as at $h$ and $i$. The tubular support or fastening thus constructed is applied in the cot $k$ of a rubber tire or other object $l$ to be inflated substantially as shown in Fig. 3 and may be vulcanized therein or caused to adhere thereto or secured therein in any suitable way, and so that its beads $g$, which when two or more are used, as shown, are shouldered in opposite directions, resist longitudinal displacement in either direction, while its milled ridges resist rotation. The outer end of the cot may be surrounded by a wrapping $m$, of wire, a sheet-metal ring, or any other device which will serve to bind the cot and the tube together.

$n$ is the casing of the valve, provided with the external screw-thread $o$ to engage the internal screw-thread $f$ of the support or fastening and $p$ is the removable valve-cap by which access is had to the valve for inflation and deflation. The valve mechanism contained within the casing $n$ may be of any approved construction. By "valve" I mean the complete or finished article which could be used without the "tubular support."

As already intimated, by the use of this tubular support or fastening, which is made wholly independent of the valve and its casing and remains as a fixture in the cot or other medium by which it is applied to the object to be inflated, it is possible to remove and insert the valve at pleasure, and thus a valve may be repaired or replaced without injury to or attack of any sort upon the support or fastening and the object to which it is applied.

It has been previously proposed to close the inner end of a supporting-tube for inflation-valves by means of an applied bushing; but my invention differs from that construction in that my closure is integral with the tube itself, and, as already indicated, this integral closure may be made by drawing that end of the tube to form an inwardly-projecting flange, or said flange may be made in any other way, so long as it is integral with the body of the tube.

What I claim is—

1. The combination with an inflation-valve and its casing, of a tube having its inner end drawn in and closed save for an air-passage, said tube adapted to receive the valve-casing and permit the ready removal thereof, substantially as described.

2. The combination with an inflation-valve and its casing, of a tube having an integral flanged inner end, provided with an air-passage, and screw-threaded internally to engage detachably the valve-casing, substantially as described.

3. A tubular support or fastening for inflation-valves, provided with a pair of circumferential beads having opposite flat or shouldered surfaces, substantially as described.

4. A tubular support or fastening for inflation-valves, having external longitudinal ridges, substantially as described.

5. A support or fastening for inflation-valves, comprising a tube, its inner end closed integrally saving for an air-passage, its outer end socketed and internally screw-threaded, external circumferential beads, and external longitudinal ridges, substantially as described.

In testimony whereof I have hereunto set my hand this 16th day of April, A. D. 1900.

JOHN H. GOSS.

Witnesses:
C. M. De Mott,
F. J. Gorse.